Nov. 18, 1941.  L. OESTEREICHER  2,263,137
FASTENER DEVICE
Filed March 2, 1940  3 Sheets—Sheet 3
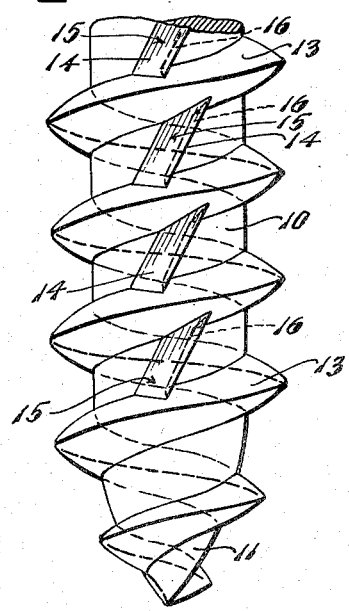
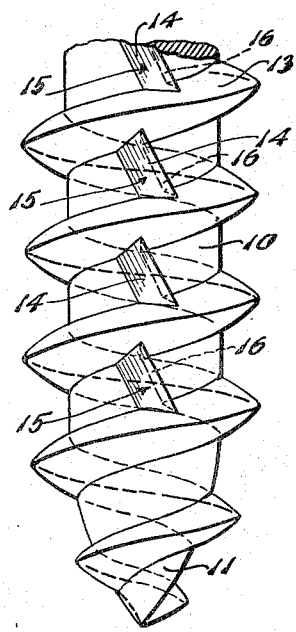
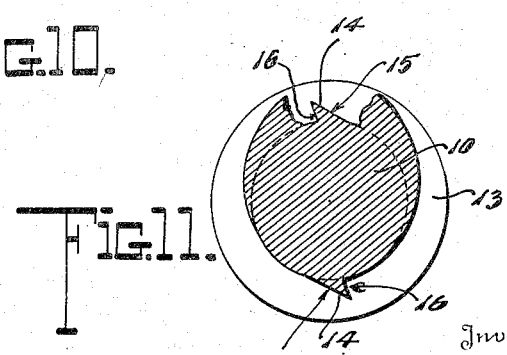

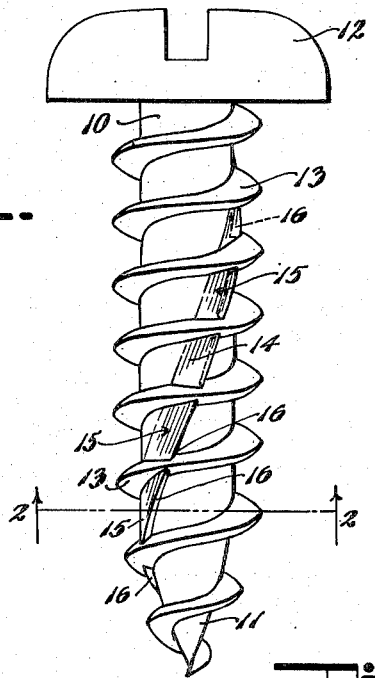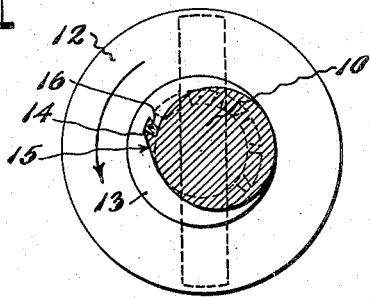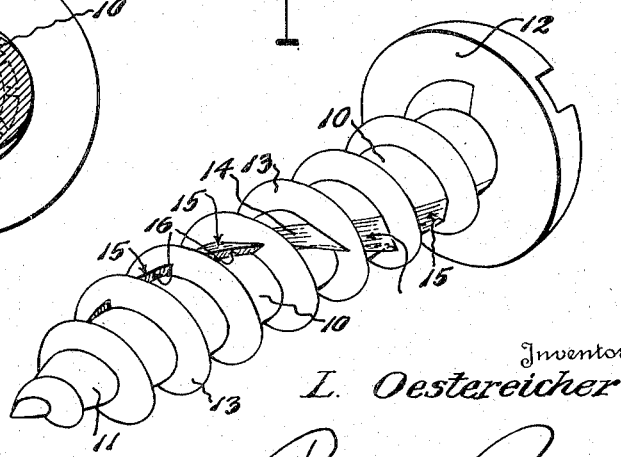

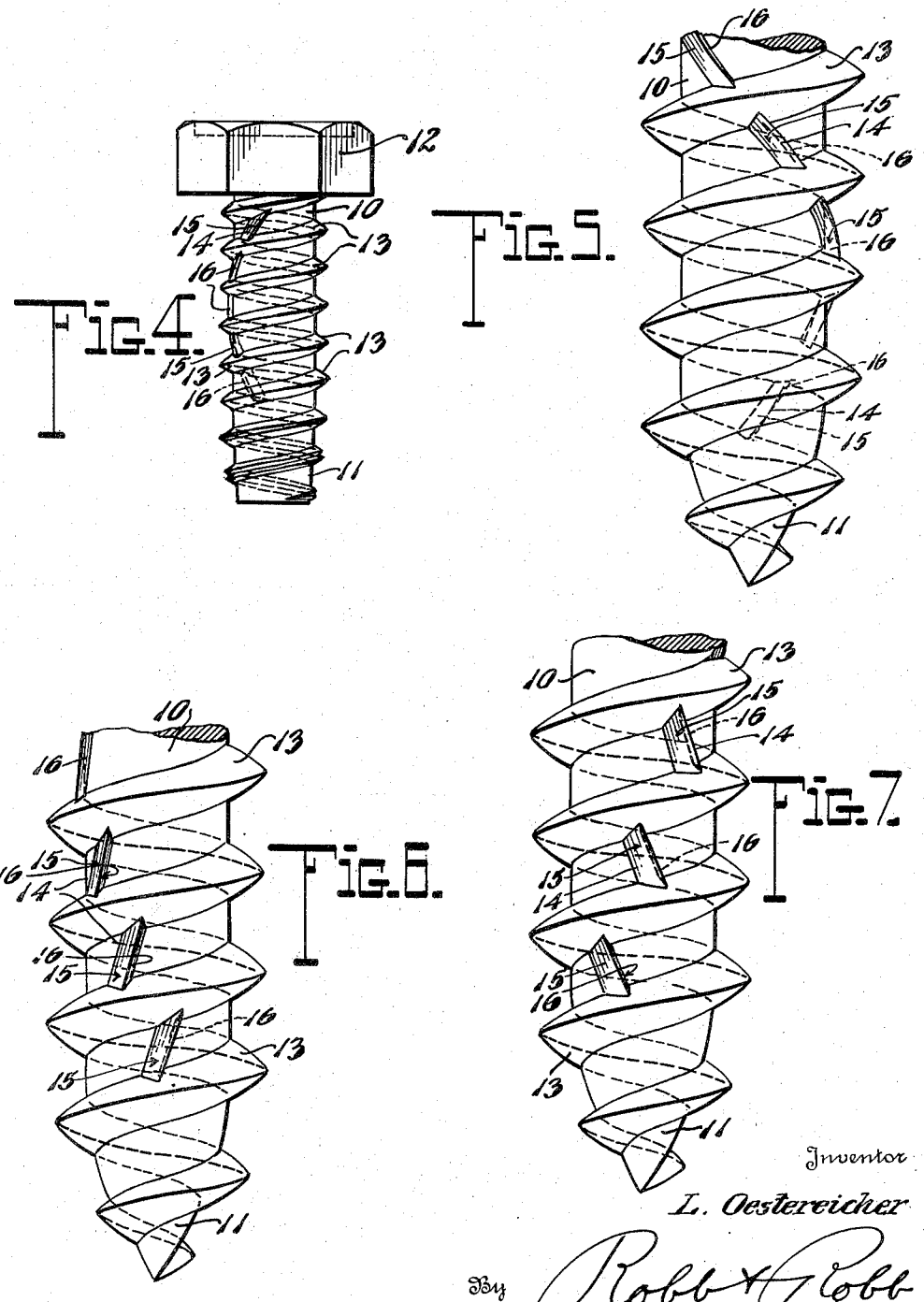

Patented Nov. 18, 1941

2,263,137

UNITED STATES PATENT OFFICE 2,263,137

FASTENER DEVICE

Louis Oestereicher, New York, N. Y., assignor to Parker-Kalon Corporation, New York, N. Y., a corporation of New York Application March 2, 1940, Serial No. 321,949

15 Claims. (Cl. 85—48)

The present invention relates to improvements in fastening devices and methods of forming the same, and in particular to that type of devices now generally known as self-tapping screws, bolts, nails and the like.

The characteristics and construction of the devices to which these present improvements are applied are disclosed in detail in such prior patents as 1,299,232, 1,526,182, 1,809,758 and others granted to Heyman Rosenberg, but it may be stated generally that the primary object in view is to provide these screw devices with means to hold the same from loosening or unscrewing accidentally from vibrations once they have been introduced into the material to which they are attached, whether said material be metal, wood, phenol condensation products or plastics and the like.

More specifically speaking, the invention consists in the formation of a holding projection upon the body of the screws at points intermediate the threads formed thereon and imparting to such projection a configuration such that the material into which the fastener is introduced is gradually displaced, preferably to a point short of its elastic limit by an inclined surface terminating in an abrupt shoulder which then engages the material and establishes an interlock therewith preventing the fastener from backing out or loosening.

It is further an object to arrange the locking projections in various positions in the thread valleys such as longitudinally in alignment with the longitudinal axis of the fastener, or spirally to the right or left about the fastener, or in staggered arrangement with reference to each other and in the direction of said axis or spirally about the fastener body.

Other objects and advantages of the invention will be hereinafter set forth and the novel features thereof defined by the appended claims.

In the accompanying drawings:

Fig. 1 is a view in elevation of a fastener embodying my improvements and showing the locking projection continuous in a spiral arrangement in the direction of the screw threads and at an angle thereto.

Fig. 2 is a transverse sectional view on the line 2—2 of Fig. 1.

Fig. 3 is a perspective view of the form shown in Fig. 1.

Fig. 4 is a view in elevation of a modified form of fastener, specifically a hexagonal head cap screw, having my invention applied thereto.

Fig. 5 is an enlarged fragmentary fastener in which the locking projections spiral about the fastener body in a direction reverse to that shown in Fig. 1.

Figs. 6 and 7 are views similar to Fig. 5, but with the projections staggered with respect to each other and extending spirally clockwise and counterclockwise about the fastener body, respectively.

Figs. 8 and 9 show reverse angular arrangements of the individual projections extending generally axially of the fastener body.

Fig. 10 is a view similar to those immediately preceding in which the projections extend in a continuous line axially of the fastener body, and Fig. 11 is a sectional view showing the arrangement of the projections at opposing sides of the body and in line with the longitudinal axis.

Like reference characters designate corresponding parts in the several figures of the drawings.

Referring first to Figs. 1 to 3 of the drawings and specifically describing the invention, 10 designates the shank or body of a fastener body having a pointed extremity 11 at one end and a head 12 at its other end. The threads 13 spiral about the shank in spaced relation so as to provide a substantial area of the shank surface in the thread valleys as typical of this form of screw.

In the threaded zone and between each helix thereof I form a projection 14, in this construction these projections being in a continuous spiral running from right to left or counterclockwise and from the head to the point of the screw. I desire to be understood, however, that while I have shown these locking projections running the full length of the fastener shank, I do not wish to be restricted in this respect, as obviously they may extend to a point short of the head or even short of the entering end as desired.

The projections 14 may be produced by any desired method and simultaneously with the formation of the thread or not, but preferably the rolling method is employed so that the projection is obtained by extrusion of the metal from the body simultaneously with the formation of the threads thereon.

As will be observed in Fig. 2, and elsewhere, the projection inclines gradually from the surface of the shank on a line substantially tangent to the body to a height about midway of the height of the adjacent thread as shown at 15, terminating in an abrupt shoulder facing in the direction counter to the direction of inward screwing of the fastener. Preferably, the shoulder face is undercut as shown at 16 to the extent of forming an angle with a horizontal line tangent to the body of about 70°, more or less.

Thus any unscrewing action tends to bite into the embedded metal and positively prevents any loosening of the fastener. Since these locking elements extend usually throughout the threaded portion, as shown in Fig. 1, the fastener may be partially screwed into the holding material and held at such position, but for other purposes the projections may terminate short of the fastener extremity, as shown in the modified form of Figs. 4 to 11, inclusive.

Since the projections 14 all correspond except in respect to their linear arrangement, it is unnecessary to describe the individual formations of the various forms other than specified in the brief description of the figures of the drawings.

It remains to be stated that where the fasteners are to be used in hard metals or materials, they are preferably hardened to prevent deformation, but otherwise this is optional. This hardening aids in the cutting action of the threads and the displacement of the material receiving the fastener from the thread path into the space between the thread helices by said threads, the threads thus acting as a pilot for the operation of the projections themselves, so that little or no material additional resistance is produced by the use of the locking feature.

I claim:

1. A fastener device of the class described, comprising a body having a threaded shank and a longitudinally extending projection extruded from the shank material to extend transversely across the base of the groove between threads and projecting above the base of said groove, said projection having an inclined face gradually extending from the body to the top of the projection and terminating in an abrupt shoulder facing in the direction of unscrewing movement of the fastener and rising from the surface of the base of the groove.

2. A fastener as set forth in claim 1, wherein the abrupt shoulder is undercut to form a sharp angle edge on the projection.

3. A fastener as set forth in claim 1, wherein the projection is formed between at least a material number of the thread helices.

4. A fastener as set forth in claim 1, wherein a projection is formed in a continuous line extended longitudinally of the fastener and intersecting the screw threads thereon.

5. A fastener device of the class described, comprising a body having a shank and spaced threads spirally extending from the face of the shank and a projection arranged transversely across the base of the groove between the threads to extend from the face of the shank, said projection being rigid, non-bendable and having a face gradually extending from the body to the top of the projection and terminating in an abrupt shoulder rising from the surface of the base of the groove, said projection being of a height less than that of the screw threads.

6. A fastener of the class described, comprising a body having a threaded shank the surface of which between the threads is smooth and free from depressions, a rigid non-bendable projection extending from the face of the shank between the helices of the threads and connecting with the threads, said projection being arranged to form a continuous rib extending longitudinally of the fastener and of a height less than the height of the helices.

7. A fastener as set forth in claim 6, wherein said rib extends in a spiral about the shank of the fastener.

8. A fastener of the class described, comprising a body having a threaded shank, and a projection extending longitudinally between each pair of helices for at least a portion of the thread part of the shank, said projection having an inclined face merging into the face of the shank and inclining gradually to the top, said projection terminating in an abrupt shoulder facing in the direction of unscrewing movement of the fastener and said projections being successively staggered along the shank.

9. A fastener as set forth in claim 8, wherein the respective projections are staggered relative to each other and are arranged in a spiral about the shank.

10. A fastener as set forth in claim 8, wherein the respective projections are arranged in spaced parallel relation extending longitudinally of the fastener.

11. A fastener as set forth in claim 8, wherein the respective projections are arranged in spaced parallel relation extending spirally about the fastener.

12. A fasteners as set forth in claim 8, wherein the respective projections are arranged in longitudinal lines at opposite sides of the fastener.

13. A fastener device of the class described, comprising a body having a shank and spaced threads spirally extending from the face of the shank and a projection arranged transversely across the base of the groove between the threads to extend from the face of the shank, said projection being rigid, non-bendable and having an inclined face gradually extending from the body to the top of the projection and terminating in an abrupt shoulder rising from the surface of the base of the groove.

14. A fastener device of the class described, comprising a body having a shank and spaced threads spirally extending from the face of the shank and a projection arranged transversely across the base of the groove between the threads to extend from the face of the shank, said projection being rigid, non-bendable and having a face gradually extending from the body to the top of the projection and terminating in an abrupt shoulder rising from the surface of the base of the groove, said abrupt shoulder being undercut to form a sharp angle edge on the projection.

15. A fastener device of the class described, comprising a body having spirally extending threads arranged along the shank of the body in spaced relation, a plurality of rigid- non-bendable projections in the valleys or grooves between the threads, the base of said valleys being free of depressions, each projection extending from one thread to the other and inclining from the base of the valley upwardly to a point between the base of the thread and the top thereof and terminating in an abrupt shoulder facing in the direction of withdrawal of the fastener device.

LOUIS OESTEREICHER.